(12) United States Patent
Roberts et al.

(10) Patent No.: US 7,827,476 B1
(45) Date of Patent: Nov. 2, 2010

(54) SYSTEM AND METHODS FOR A TASK MANAGEMENT USER INTERFACE

(75) Inventors: Ethan D. Roberts, Natick, MA (US); Serena M. Doyle, Hopkinton, MA (US); Hanna Yehuda, Newton, MA (US); Steven S. Teng, Littleton, MA (US)

(73) Assignee: EMC Corporation, Hopkinton, MA (US)

( * ) Notice: Subject to any disclaimer, the term of this patent is extended or adjusted under 35 U.S.C. 154(b) by 1902 days.

(21) Appl. No.: 10/872,123

(22) Filed: Jun. 18, 2004

(51) Int. Cl.
*G06F 17/00* (2006.01)

(52) U.S. Cl. .................. 715/204; 715/243; 715/772

(58) Field of Classification Search .............. 715/772, 715/771, 764, 204, 243
See application file for complete search history.

(56) References Cited

U.S. PATENT DOCUMENTS

| | | | | |
|---|---|---|---|---|
| 5,530,861 A * | 6/1996 | Diamant et al. ............... 705/8 |
| 5,542,088 A * | 7/1996 | Jennings et al. ............ 718/103 |
| 5,796,951 A * | 8/1998 | Hamner et al. ............. 709/223 |
| 6,092,048 A * | 7/2000 | Nakaoka ...................... 705/9 |
| 6,678,714 B1 * | 1/2004 | Olapurath et al. .......... 718/104 |
| 6,678,716 B1 * | 1/2004 | Pronsati et al. ............ 709/201 |
| 6,754,664 B1 * | 6/2004 | Bush ............................ 1/1 |
| 6,954,737 B2 * | 10/2005 | Kalantar et al. ............. 705/50 |
| 6,966,033 B1 * | 11/2005 | Gasser et al. .............. 715/738 |
| 2002/0143949 A1 * | 10/2002 | Rajarajan et al. .......... 709/226 |
| 2005/0028158 A1 * | 2/2005 | Ferguson et al. ........... 718/100 |
| 2006/0106846 A1 * | 5/2006 | Schulz et al. ............. 707/101 |
| 2007/0067772 A1 * | 3/2007 | Bustamante .............. 718/100 |

\* cited by examiner

*Primary Examiner*—William L Bashore
*Assistant Examiner*—Gregory A Distefano
(74) *Attorney, Agent, or Firm*—Chapin IP Law, LLC

(57) ABSTRACT

In a large storage area network (SAN), many administrative tasks perform various operations. Managing the tasks can be a formidable activity. A network management application, operable to identify and manipulate the tasks, organizes the tasks in a common graphical user interface (GUI) which allows task management from a single operator console. The task manager provides a GUI having display panes for managing the tasks. The task manager allows selection and invocation of tasks, in which the same task is identifiable by each of the plurality of attributes. The task manager displays the hierarchy of tasks in a task tree, including selectable task icons, in a task tree pane. The task icons are expandable into the corresponding subtasks and operations in a task list pane, and status details about the operations and task status are displayed in a context detail pane. An operator traverses the task tree to drill down into the operation and completion status of tasks in the task tree.

17 Claims, 10 Drawing Sheets

SYSTEM AND METHODS FOR A TASK MANAGEMENT USER INTERFACE

BACKGROUND OF THE INVENTION

Conventional managed information environments typically include a plurality of interconnected manageable entities. In a managed information environment including a storage area network (SAN), the manageable entities may include storage arrays, connectivity devices and database entities, collectively operable to provide information storage and retrieval services to users. In the storage area network, various system administration activities are performed at different times to monitor and maintain the storage area network at an optimal level of operation. In modern managed information systems, system administration often takes the form of a graphical user interface (GUI), which provides a so-called "point and click" manner of selecting options and commands, as is known to those of skill in the art.

Often, the storage area network is overseen by an operator responsible for ensuring that the various system administration activities are commenced at an appropriate time and completed in a satisfactory manner. In a large storage area network, including many manageable entities, the system administration activities may become formidable. The system administration activities may include, for example, installing new manageable entities, performing backup of existing manageable entities, configuring zoning of the manageable entities, and other performance related activities intended to ensure uninterrupted and timely service to the users of the SAN. In order to avoid burdening the manageable entities in the SAN, the administrative activities are often commenced at idle times, such as overnight, and may be performed in a batch, or background mode to further minimize impact on user based throughput. Such administrative activities often take the form of tasks, which are executable entities for performing various SAN management functions. Therefore, the storage area network is continually monitored and maintained by tasks performing administrative monitoring and maintenance activities and actions.

SUMMARY

Storage area networks typically perform administrative activities for monitoring and maintaining the storage area network in an optimal operational condition. Monitoring and maintenance activities often take the form of tasks, which invoke an application directed at a particular administrative operation or function. Typically, a dialog or wizard associated with the application create or instantiate the task, which is an executable entity for performing a set of management functions to fulfill the administrative activities. In a large storage area network, the number of tasks can be substantial. Further, such tasks are frequently run in an offline or batch mode during periods of low SAN activity, so as to not impede SAN throughput to the user community supported by the SAN.

Accordingly, managing the tasks can be a formidable activity. An operator typically performs SAN management functions at a console directed to SAN administration. The console couples to a server which is in communication with the various manageable entities interconnected via the SAN. Software based entities known as agents execute on the manageable entities for reporting and manipulating parameters of the various manageable entities. In a large SAN, many such tasks may commence execution at various times, may encounter problems requiring manual operator intervention, and generate results which are correlated or accumulated for various purposes.

The invention defined by the present claims is based, in part, on the observation that conventional network management tasks often execute on various nodes dispersed throughout a network, such as a SAN, commence at various times based on a number of factors, and generate output and status in a variety of locations and in different formats. Further, since such tasks typically execute offline and/or at odd times, identifying completion, determining current status and problems, and tracking results may be an iterative, case by case procedure which varies by each particular task. Accordingly, it is difficult for a network manager, such as a SAN operator, to effectively manipulate and monitor a number of tasks in a large SAN, and to correlate results in an effective, expedient manner to ensure adequate and timely completion of all tasks.

Configurations of the invention substantially overcome the above described shortcomings presented by multiple task definitions (i.e. executable files) dispersed throughout a storage area network having various commencement, termination, and status reporting mechanisms. A task manager operable to identify and manipulate the tasks organizes the tasks in a common graphical user interface (GUI) which allows task management from a single operator console. The task manager provides a GUI having display panes, or panels, for displaying and receiving information for managing the tasks. The task manager allows selection and invocation of tasks according to multiple attributes, selective commencement at prescribed times, status monitoring, and correlation of results from a single operator location. A dialog or wizard allows the operator to define the parameters of a task based on the application which performs the task. Each task may include nested task lists, forming a hierarchy of tasks, each of which corresponds to a particular application. The task manager enumerates operations contained in each task, and invokes executable entities for performing the operations according to the task hierarchy. The task manager displays the hierarchy of tasks in a task tree, including selectable task icons in a selection tree pane, in which tasks are identified by one or more selectable attributes. The task icons are expandable into the corresponding subtasks and operations in a task list pane, and status details about the operations and task status are displayed in a context details pane. An operator traverses the window in a "point and click" manner to drill down into the operation and completion status of one or more tasks in the task tree.

In further detail, the graphical user interface provides a method for executing tasks associated with storage area network management by enumerating a plurality of tasks for execution, in which the tasks correspond to a plurality of applications for performing management functions on manageable entities in the storage area network. The interface organizes the tasks according to a hierarchical structure indicative of related tasks, and according to the manageable entities affected by the tasks. The interface then presents the user or operator with an ordered display of the tasks which is dynamically responsive to user requests and indicative of the organized hierarchical structure. The operator may then manage the tasks via the GUI by identifying tasks from the ordered display, based on attributes of the tasks, and display context specific parameters of the task. The task manager receives the user request by clicking on an icon or row indicative of a particular task and management function, and performs the selected management function on the selected task.

Exemplary management functions include request status, schedule execution, termination, display operational details, order modification, sort, identify type, and display operation breakdown, to name several. Alternate configurations include a variety of tasks applicable to the particular managed information environment concerned.

The interface organizes the tasks according to a plurality of attributes, in which the same task is identifiable by each of the plurality of attributes. Presentation of the tasks includes displaying a plurality of display panes, or panels, on a display screen, in which each of the display panes is operable to display task management information of a particular type. A selection tree pane displays a hierarchical selection tree indicative of tasks, from which the operator selects tasks or task groups to apply management functions to. A task list pane displays the subset of tasks selected in the hierarchical selection tree, and a context details pane, displays context specific details corresponding to a selected row icon in the task list pane, providing further detail about the specific tasks from a selected task group. Organization and selection by task attributes includes, in the exemplary arrangement shown, status, logs, and affected manageable entities. Alternate arrangements include other attributes through which selection is accomplished.

Tasks are executable entities for performing a particular network management operation or set of operations. In particular configurations, task executable entities are generated from a dialog or wizard corresponding to an application performing the task, typically an interactive operator driven procedure. Enumeration of tasks available for execution further includes identifying an application corresponding to the task, and performing a dialog corresponding to the application for generating the task, in which the dialog is operable to invoke the application for completing SAN maintenance instructions, or management functions, by the application. Each task includes one or more operations, in which the operations define a predetermined order of steps for completion of the task. The task manager then associates the generated task with the plurality of tasks available.

In the exemplary arrangement disclosed, tasks may be arranged according to related tasks, in which the related tasks comprise task lists. Organizing tasks further include organizing related tasks as children of the task list, as observed visually in the task selection tree, in which the related tasks are operable to be executed together.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Conventional network management tasks often execute on various nodes dispersed throughput the network, commence at various times based on a number of factors, and generate output and status in a variety of locations. Further, since such tasks typically execute offline and/or at odd times, identifying completion, determining current status and problems, and tracking results may be an iterative, case by case procedure which varies by each particular task. Accordingly, it is difficult for a network manager, such as a SAN operator, to employ a conventional network management application to effectively manipulate and monitor a number of tasks in a large SAN, and to correlate results in an effective, expedient manner to ensure adequate and timely completion of all tasks.

A task management graphical user interface (GUI) substantially overcomes the above described shortcomings presented by multiple task definitions (i.e. executable files) dispersed throughout a storage area network having various commencement, termination, and status reporting mechanisms. The task management GUI drives a network management application operable to identify and manipulate the tasks organizes the tasks in a common graphical user interface (GUI) which allows effective task management of various tasks from a single operator console. The task manager provides a GUI having display panes, or panels, for displaying and receiving information for managing the tasks. The task manager allows selection and invocation of tasks, selective commencement at prescribed times, status monitoring, and correlation of results from a single operator location. A dialog or wizard allows the operator to define the parameters of a task based on the application which performs the task. Each task may include nested task lists, forming a hierarchy of tasks, each which corresponds to a particular application. The task manager enumerates operations contained in each task, and invokes executable entities for performing the operations according to the task hierarchy. The task manager displays the hierarchy of tasks in a task tree, including selectable task icons in a task tree pane. The task icons are expandable into the corresponding subtasks and operations in a task list pane, and status details about the operations and task status are displayed in a context detail pane. An operator traverses the window in a "point and click" manner to drill down into the operation and completion status of one or more tasks in the task tree.

Figure 1:
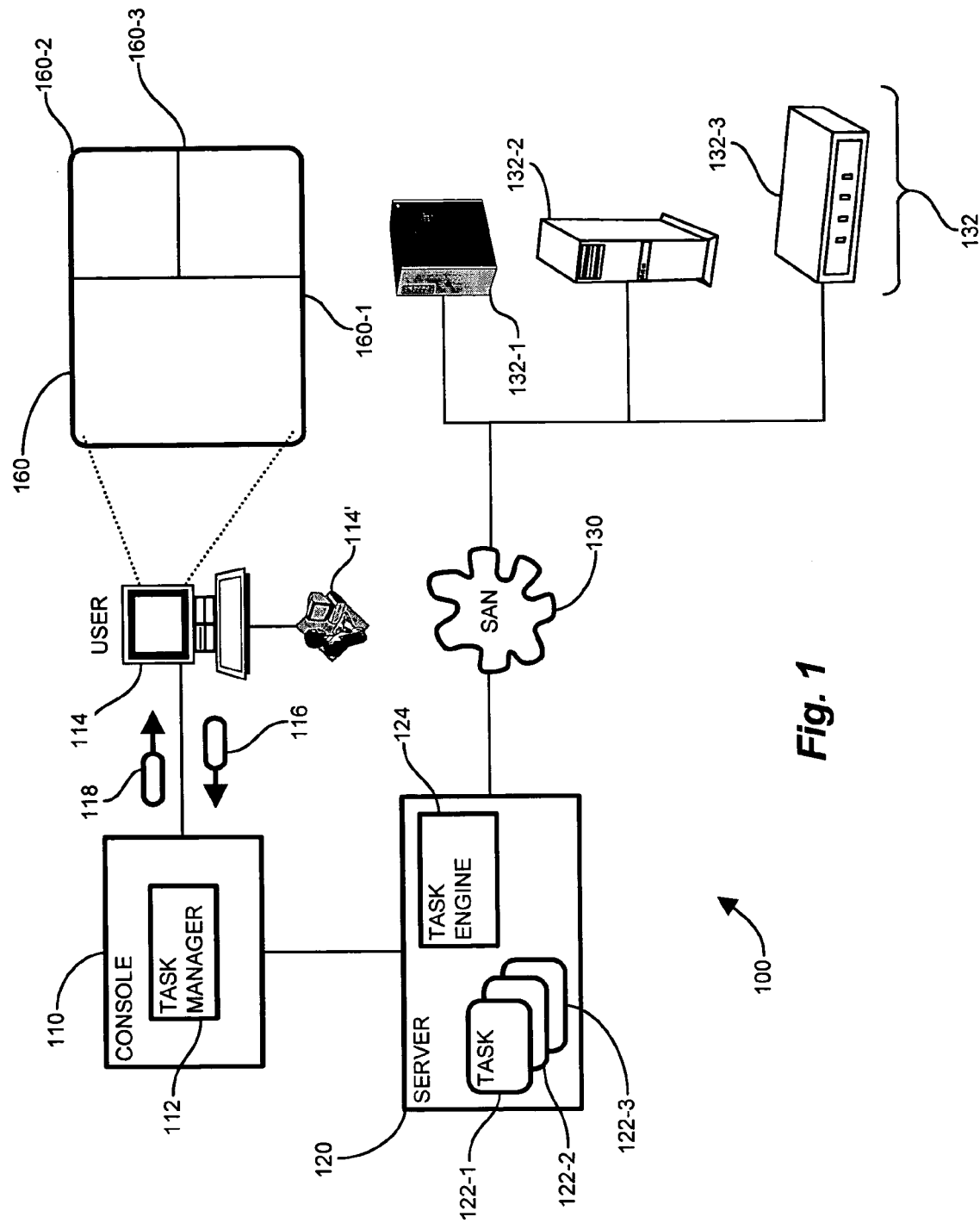
FIG. 1 is a context diagram of an exemplary managed information environment including a storage area network and suitable for use with the task management mechanism.

FIG. 1 is a context diagram of an exemplary managed information environment 100 including a storage area network 130 and suitable for use with the task management graphical user interface. Referring to FIG. 1, the managed information environment 100 includes a console 110 and a server 120. The console 110 is coupled to a user display 114 operable to receive commands and display results via a graphical user interface (GUI) screen 160 including one or more display panes 160-1 . . . 160-3. The server 120 is coupled to the console 110 and also to the storage area network (SAN) 130 interconnecting a plurality of manageable entities 132. The manageable entities 132 include storage arrays 132-1, storage servers 132-2, such as relational database management systems (RDBMSs), and connectivity devices 132-3.

The server 120 includes a plurality of tasks 122-1 . . . 122-N (122, generally), adapted to perform management functions by executing the tasks 122 in a task engine. 124. The server 120 is responsive to a task manager GUI 112 in the console 110 for performing the management functions via the tasks in response to user requests 116, and for responding with the results 118.

Figure 2:
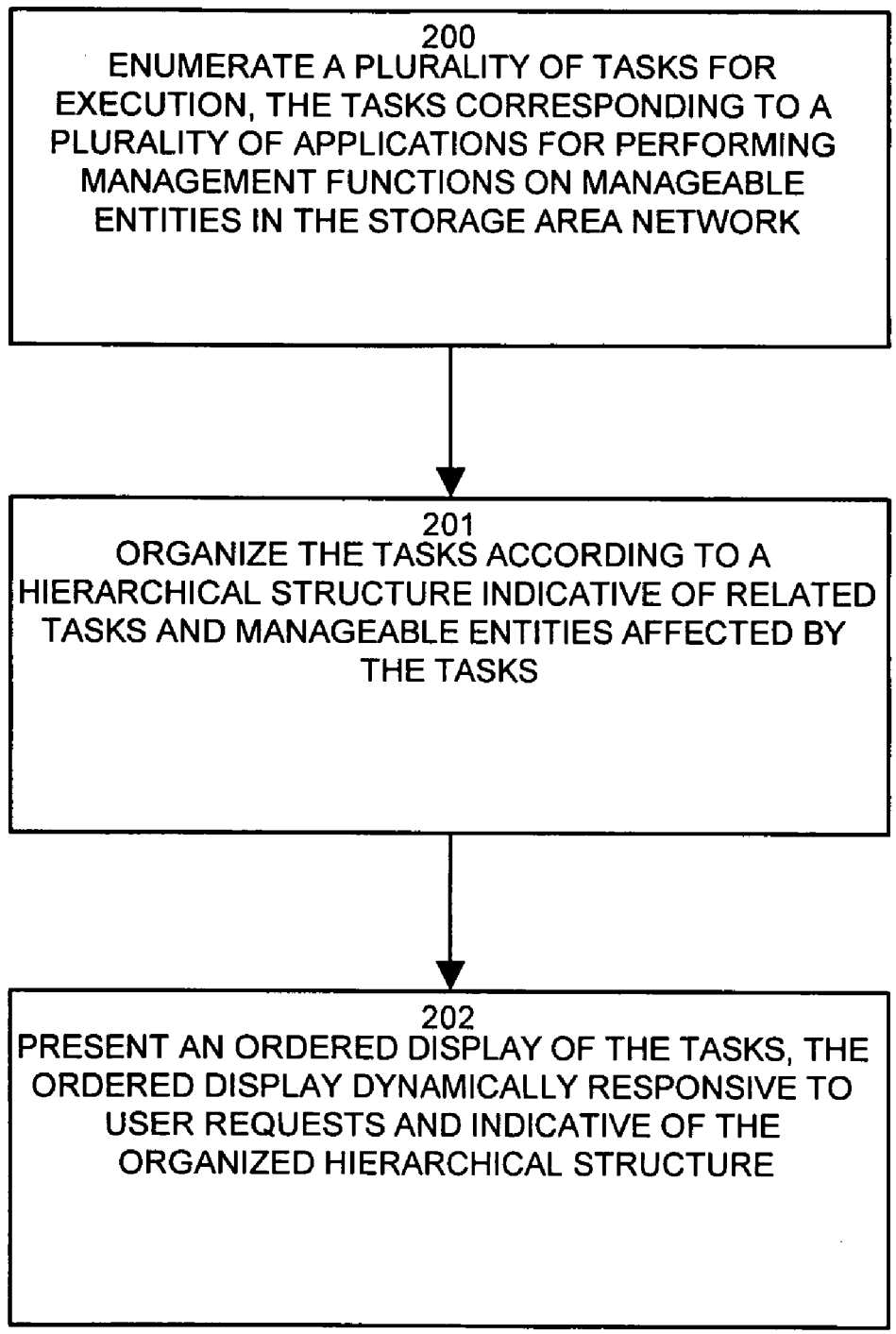
FIG. 2 is a top-level flowchart of task management as described herein.
Figure 3:
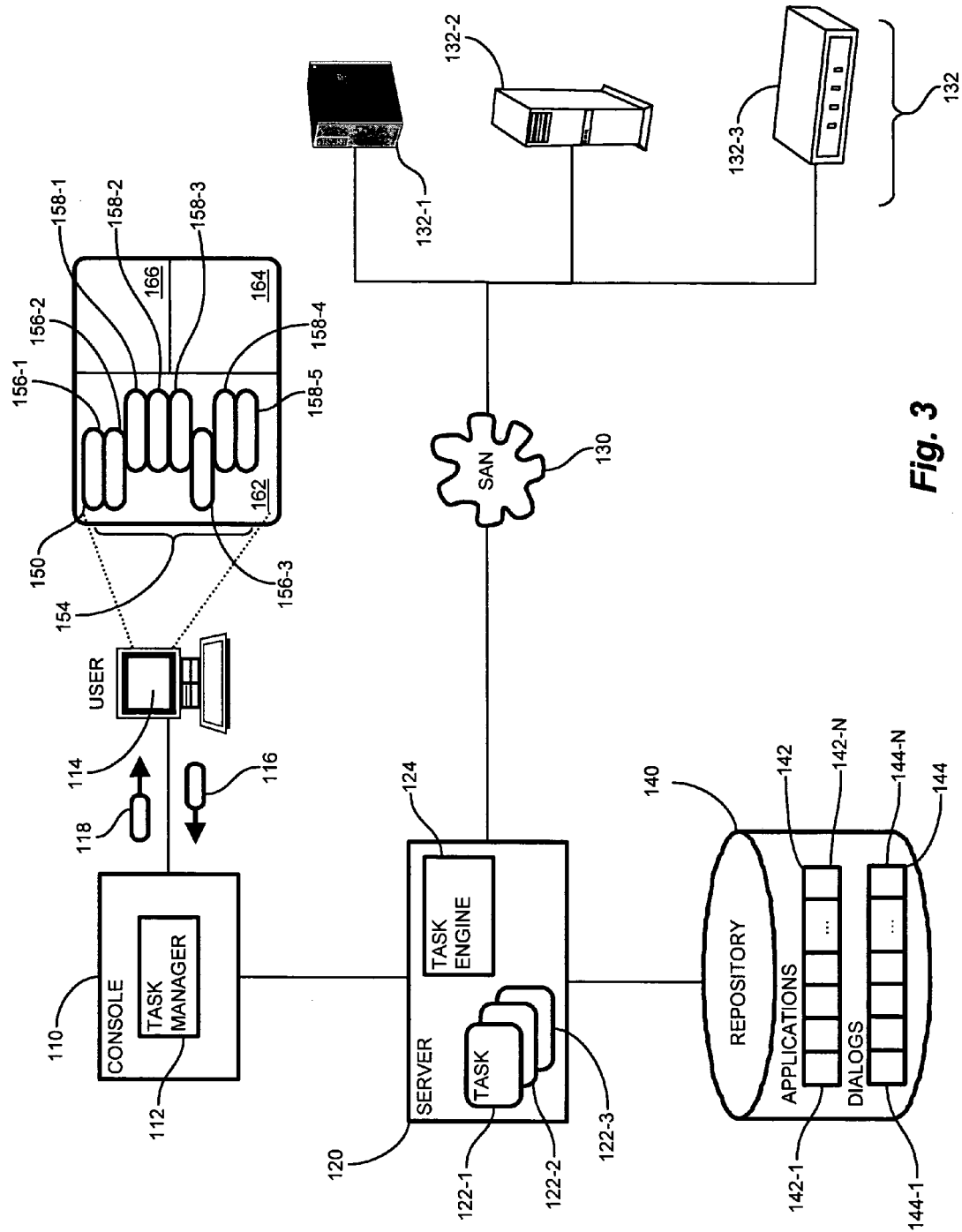
FIG. 3 is a block diagram of a console and server in the exemplary managed information environment operable according to the system of the present invention.

FIG. 2 is a top-level flowchart of task management as described herein. Referring to FIGS. 2 and 3, in the exemplary storage area network 130, the method for executing tasks associated with storage area network management includes enumerating a plurality of tasks 122 for execution, the tasks corresponding to a plurality of applications for performing management functions on manageable entities 132 in the storage area network 130, as depicted at step 200. The task manager GUI 112 enumerates the tasks 122 as a selection tree 150 on the display screen 160. The display screen 160 displays a plurality of panes 160 including a selection tree pane 162. The task manager GUI 112 organizes the displayed tasks according to a hierarchical structure indicative of related tasks 158 and manageable entities 132 affected by the tasks 122, as shown at step 201. The task manager GUI 112 presents an ordered display of the tasks in the selection tree 154 as task icons 154, including task lists icons 156-1 . . . 156-3 and tasks 158-1 . . . 158-5. A number of task lists 156 may be nested. The resulting ordered display 150 is dynamically responsive to user requests 116 and indicative of the organized hierarchical structure 150.

FIG. 3 is a block diagram of a console and server in the exemplary managed information environment 100 operable according to the system of the present invention. As indicated above, in the managed information environment 100, the user 114', such as an operator of the storage area network 120, frequently performs various management functions concerning the storage area network 130. Such management functions may include, by way of example only, installing various manageable entity devices, backup of particular storage arrays, and importing zone sets, as will be illustrated in the exemplary GUI screens 160 below.

Each of the tasks 122 performs one or more of the management functions, and are instantiated (created) from an application performing a dialog or wizard. Accordingly, the server 120 includes a task engine 124 for performing the management functions by executing a task 122, and is further coupled to a repository 140 containing dialogs 144-1 . . . 144-N and corresponding applications 142-1 . . . 142-N for generating the tasks 122. The tasks 122 are displayed on the display screen 160 connected to the console 110 and operable by the operator 114'. The display screen 160 includes a selection tree pane 152, including selection icons 154, each corresponding to selection items 154 including task lists 156-1 . . . 156-N (156 generally) and tasks 158-1 . . . 158-N (158 generally). The selection icons 154 may also include other groupings of manageable entities 132, such as storage systems (arrays) 132-1, connectivity elements 132-3, and databases 132-2.

A task list pane 166 includes a list of tasks 158 corresponding to a currently selected task list 156 in the selection tree pane 162. The task list pane 166 lists row entries 165-1 . . . 165-N (FIG. 8, below) for each task 158. Each row entry 165 also includes related information fields such as completion status and start time, discussed further below. A context specific pane 164 includes context specific information pertaining to a selected row entry 165 in the task list pane. The context specific pane 164 may include an ordered set of operations included in the task 158 corresponding to the selected row entry 165, and may further be subdivided into tabs corresponding to types of available information, also discussed further below.

Figure 4:
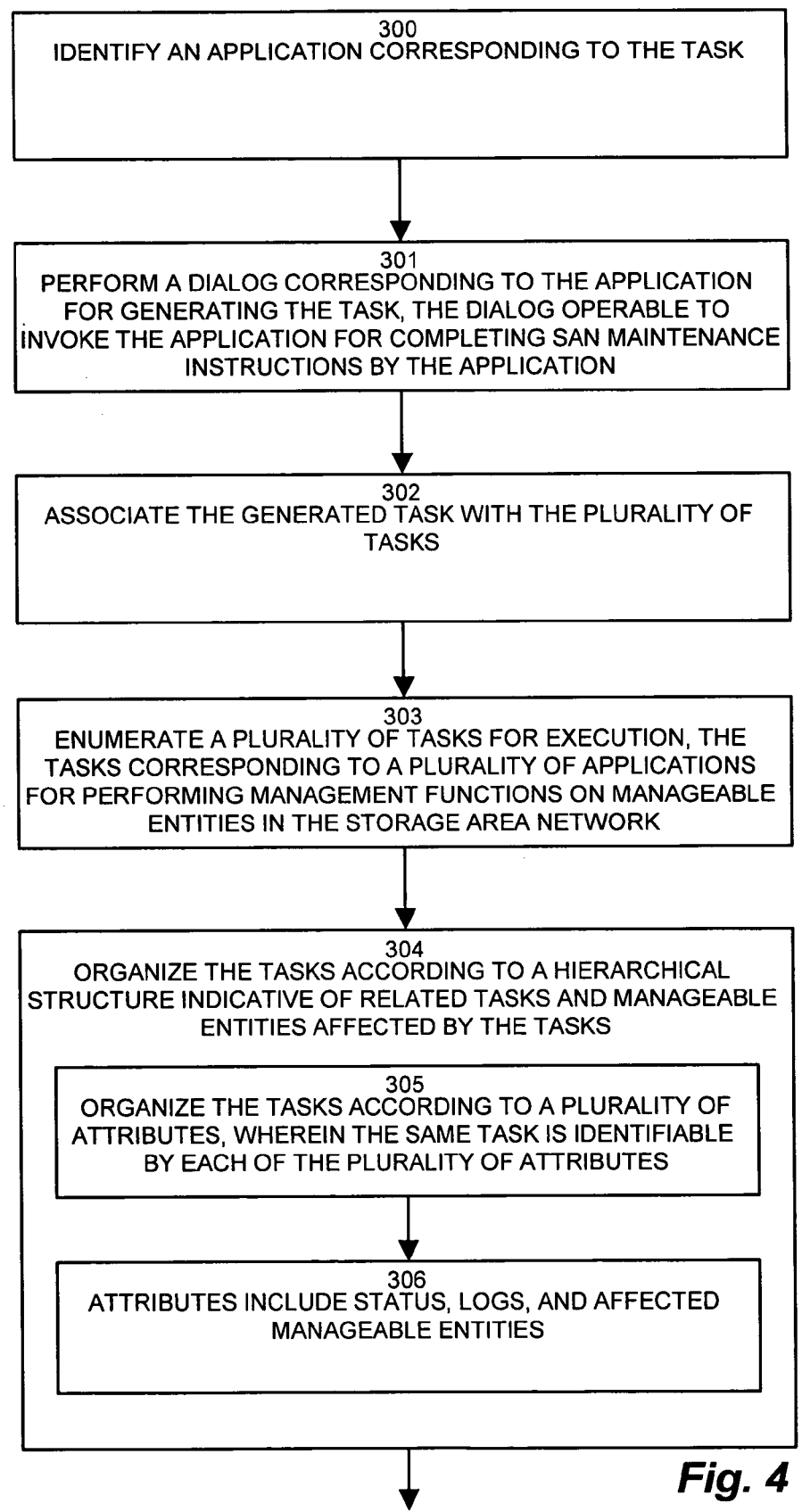
FIGS. 4-6 are a flowchart of task management in greater detail.
Figure 5:
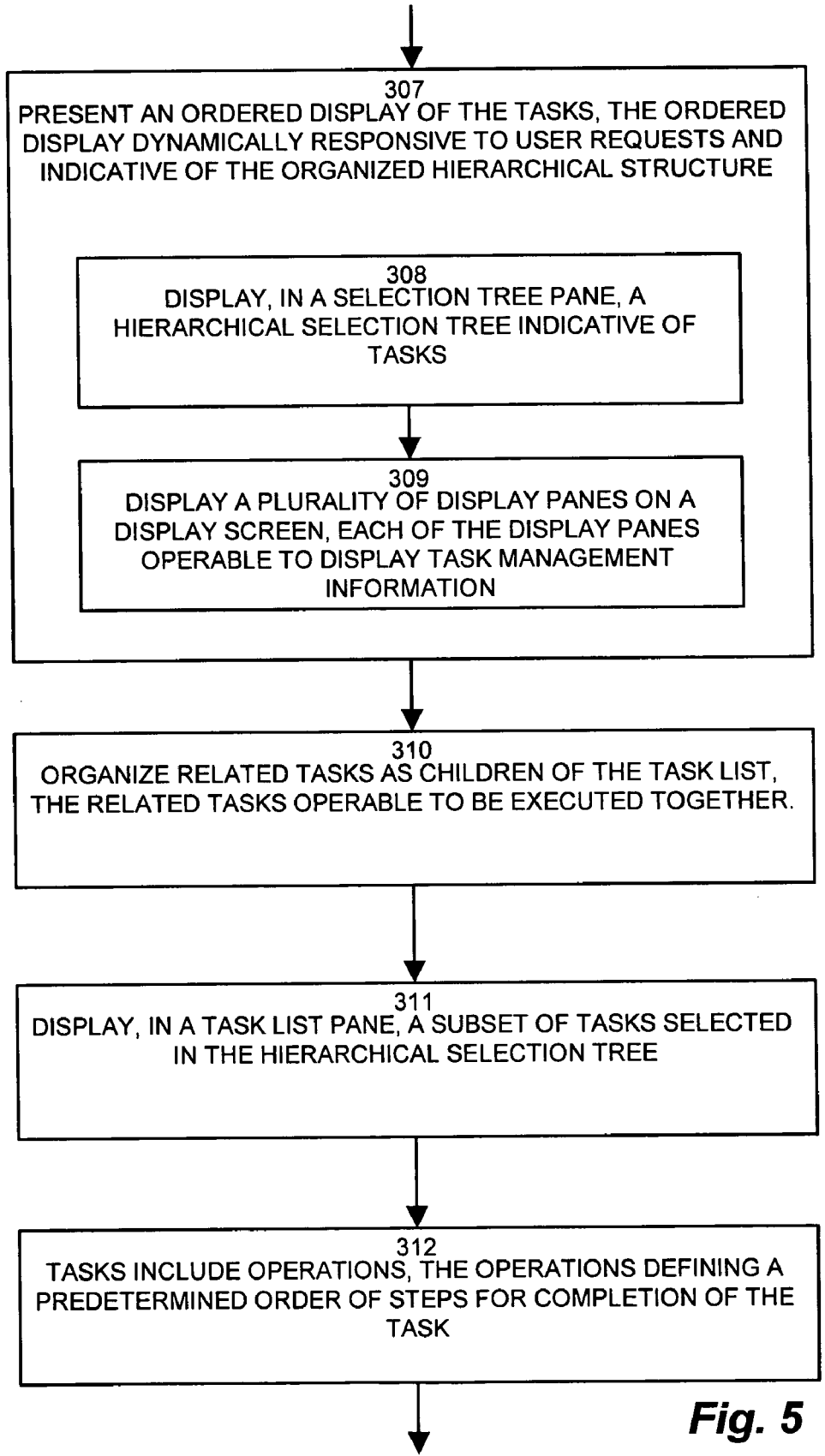
Figure 6:
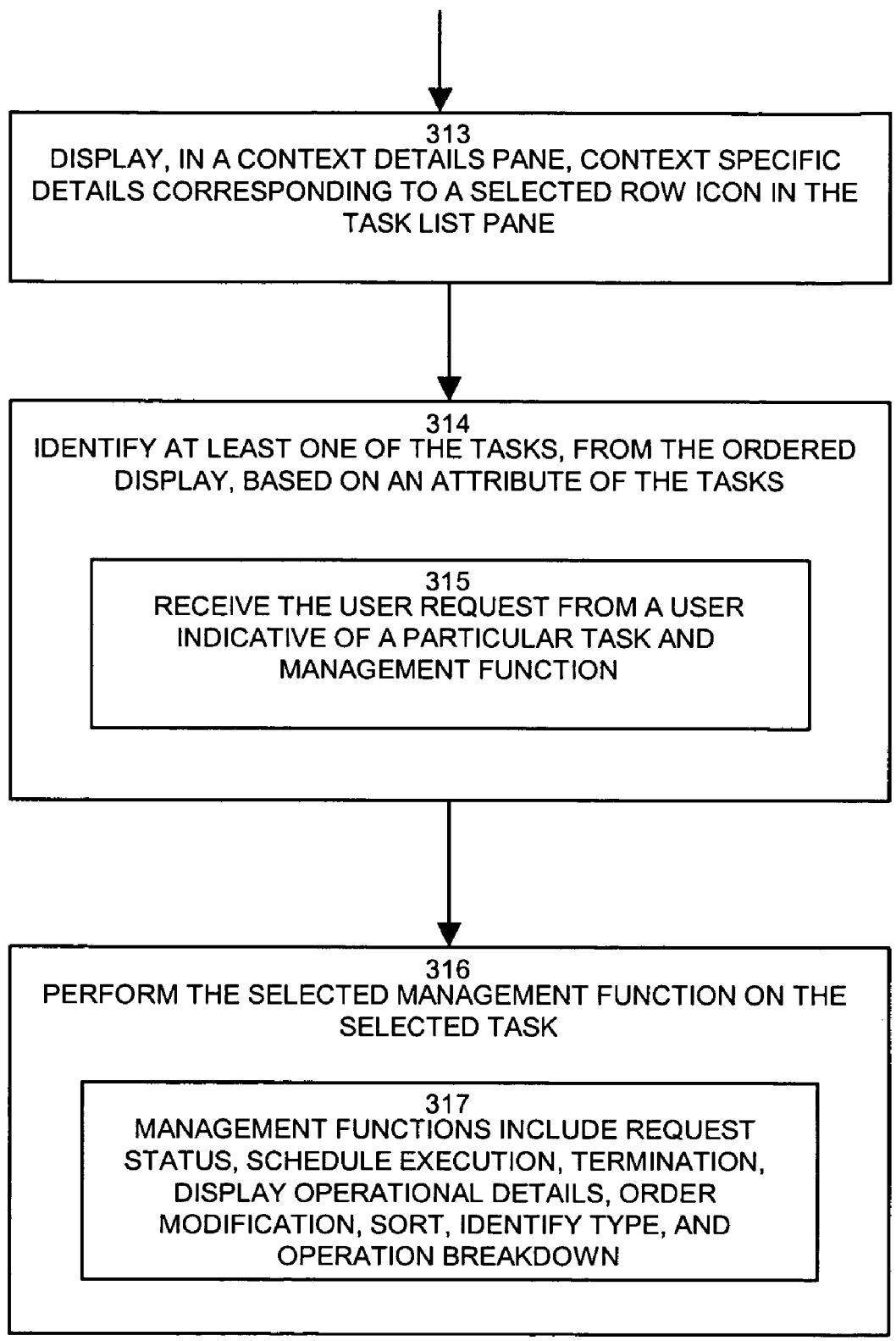

FIGS. 4-6 are a flowchart of task 122 management in the environment of FIG. 3 in greater detail. In the storage area network of FIG. 3, the method for executing tasks 122 associated with storage area network management further includes enumerating a task 122 for execution by identifying an application 142 corresponding to the task 122, as depicted at step 300. The server 120 provides various services to the SAN 130 via the plurality of applications 142-1 . . . 142-N (142 generally), stored in the repository 140 for execution by the task engine 124. The server 120 performs a dialog 144-1 . . . 144-N (144 generally) corresponding to a particular application 142 for generating the task 122, in which the dialog 144 is operable to invoke the corresponding application 142 for completing SAN maintenance instructions by the application 142 per the generated task 122, as depicted at step 301. The dialog 144, also known as a "wizard," interactively gathers parameters from the user or operator 114' concerning a particular task 122. The task engine then associates the generated task 122 with a plurality of tasks 122-N in the server 120, as shown at step 302.

The desired tasks 122 are generally selected by a user or operator 114' via the console 110, however may, in alternate configurations, be automated or derived from other tasks 122. The tasks 122, when executed, perform various management functions in the storage area network 130. For example, typical tasks may be installing new manageable entities, allocating storage volumes, performing backups, and starting agents, to name several. The task manager 112, responsive to the user requests 116, invokes the task engine 124 to enumerate the plurality of tasks 122-N for execution, in which the tasks correspond to a plurality of applications 142-N for performing management functions on manageable entities 132-N interconnected via the storage area network 130, as depicted at step 303.

The task manager 112 receives the set of enumerated, generated tasks 122 and organizes the tasks 122 according to the hierarchical structure 150 indicative of related tasks 158 and manageable entities 132 affected by the tasks 122, as depicted at step 304. The task manager 112, therefore, organizing the tasks in a selection tree 150 according to a variety of attributes, in which the same task is identifiable by each of the plurality of attributes, as shown at step 305. For example, the task manager 112 may organize the hierarchical selection tree 150 according to attributes including status, logs, and affected manageable entities, as depicted at step 306. Accordingly, using the selection tree 150 in the console display 114, an operator 114' may manipulate or query a particular task 122 by identifying any of the attributes, such as tasks affecting particular types of storage arrays 132-1, or tasks 122 which have not yet completed (status). In other words, a particular task 122 may be queried from several attributes identified as selection icons in the selection tree.

The task manager 112 therefore presents an ordered display of the tasks 122, in which the ordered display 160 is dynamically responsive to user requests 116 and indicative of the organized hierarchical structure 150, as depicted at step 307. The display screen 160 also presents a plurality of display panes 164, 166 on the display screen 114, in addition to the selection tree pane 162 (step 308), in which each of the display panes 162, 164 and 166 is operable to display task management information, as disclosed at step 309.

Therefore, the task manager 112 displays hierarchical selection tree indicative of tasks displays in the selection tree pane 162, as shown above in step 308, in which the hierarchy is indicative of related tasks 122. The related tasks 122 further comprise task lists 158-1 . . . 158-3, in which the organizing further comprising organizing related tasks (158-1 . . . 158-3, for example) as children of the task list (156-2), such that the related tasks are operable to be executed together, as depicted at step 310. The nested hierarchy exhibited by the selection tree 150, therefore, displays task icons 154, each corresponding to a task 156 or task list 158. Accordingly, each task icon 154 corresponds to either a single task 158 or a task list 156 indicative of other tasks 158, which may either be atomic tasks or task lists, terminating in individual (atomic) tasks, or "leaves" of the tree.

Task icons 154 are user selectable, as will be described further in the examples below, and trigger the task manager 112 to display, in the task list pane 166, a subset of tasks 158 selected in the hierarchical selection tree 150, as depicted at step 311. The task list pane 166 displays details corresponding to a selected individual task 158, or of all tasks 158 of a selected task list 156. Further, each of the tasks 122 includes one or more operations, in which the operations define a predetermined order of steps for completion of the task 122, as shown at step 312. The task list pane 166, therefore, displays tasks and operations nested within selected task icons 154.

The task list pane 166 displays each task and corresponding operation thereof as a line item 165 on a separate line, including corresponding details (attributes) on the line. Each line item 165 is further selectable, and results in the task manager 112 displaying, in the context details pane 164, context specific details corresponding to the selected row 165 or row icon in the task list pane 166, therefore displaying context specific parameters of the task or operation, as depicted at step 313.

From the user display 150 and corresponding panes 162, 164 and 166, the operator 114' manages the tasks 154, in which managing further includes identifying at least one of the tasks 154, from the ordered display 150, based on an attribute of the tasks 154, as shown at step 314. The task manager 112 receives the user request 116 from a user 114' indicative of a particular task 122 and management function, either by selecting a checkoff box 502 corresponding to the task or task list 154 or by selecting the line item 165 or icon corresponding to the task or operation. Alternate user interface selection mechanisms are also recognizable, as will be described further below in the examples in FIGS. 7-10. The task manager 112 then performs the selected management function on the selected task, as disclosed at step 316. The invokable management functions include, by way of example only, request status, schedule execution, termination, display operational details, order modification, sort, identify type, and operation breakdown, as depicted at step 317. Accordingly, the task manager 112 allows operator management of the tasks 112 in the storage area network from a single operator display 114, in communication with the applications 142 and manageable entities 132-N implicated by the management operations, and provides an execution and manipulation mechanism queryable according to multiple attributes of the tasks, such as completion status, types of devices (manageable entities 132) affected, and success/failure criteria.

Figure 7:
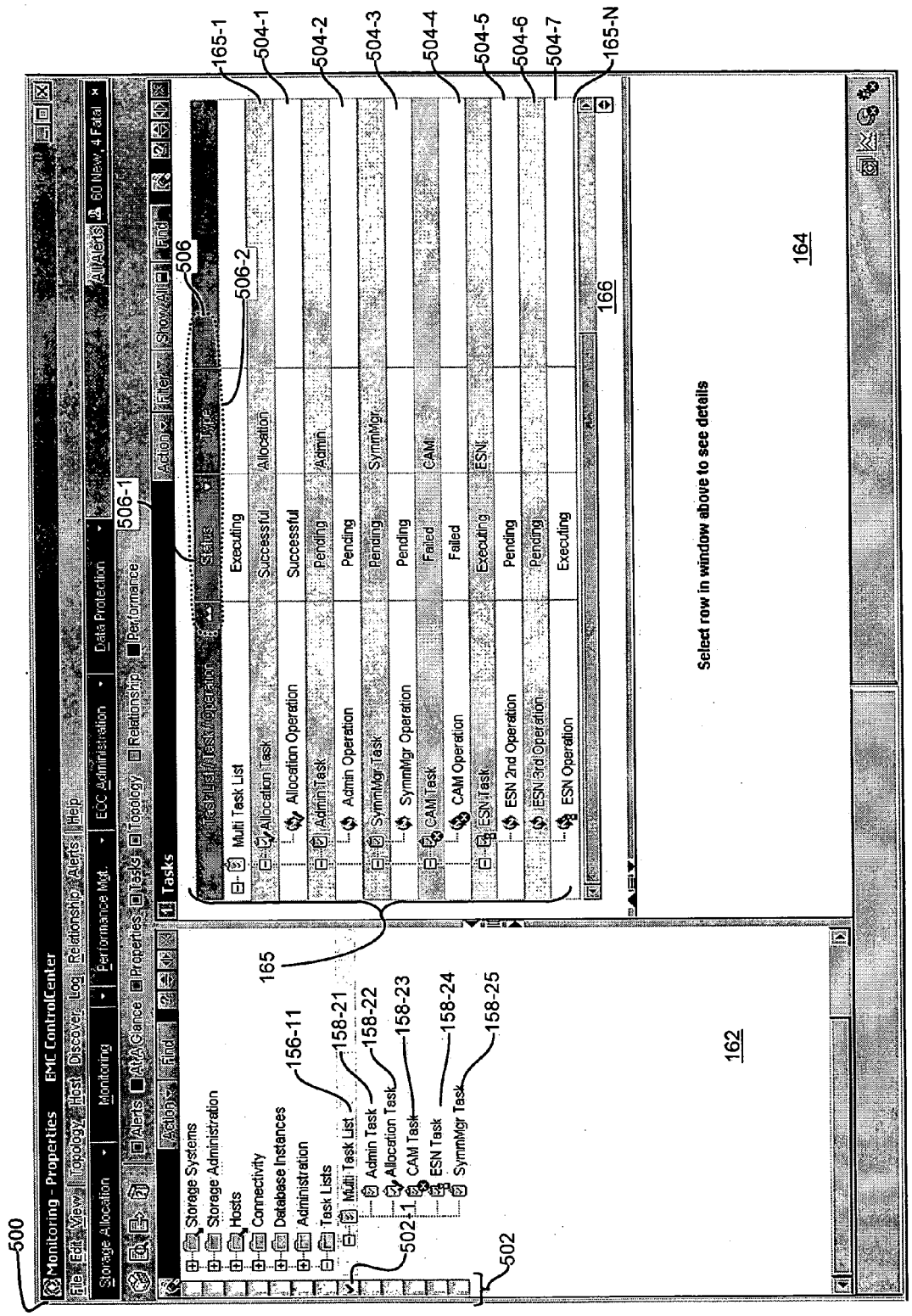
FIGS. 7-10 are an example of task management employing the flowchart of FIGS. 4-6.

FIGS. 7-10 are an example of task management screens 160 employing the flowchart of FIGS. 4-6. Referring to FIG. 7, an exemplary screen window 500 from the user display 114 shows a task selection tree 154 expanded as line items 165-N in the task list pane 166. Checkoff boxes 502 are user selectable to expand tasks 122 in the task selection pane 166. In the exemplary selection tree 154, task list 156-11 is selected by checkoff box 502-1 and expanded into tasks 158-21 . . . 158-25, all expanded as line items 165 in the task list pane 166. Each task 158 includes one or more operations 504-1 . . . 504-7, expanded also as line items 165 below the corresponding task 158 line item 165. Each of the line items 165-1 . . . 165-N includes attributes 506-1, 506-2 corresponding to each line item, specifically completion status 506-1 and task type 506-2, shown only for the task 158-N line items 165.

Figure 8:
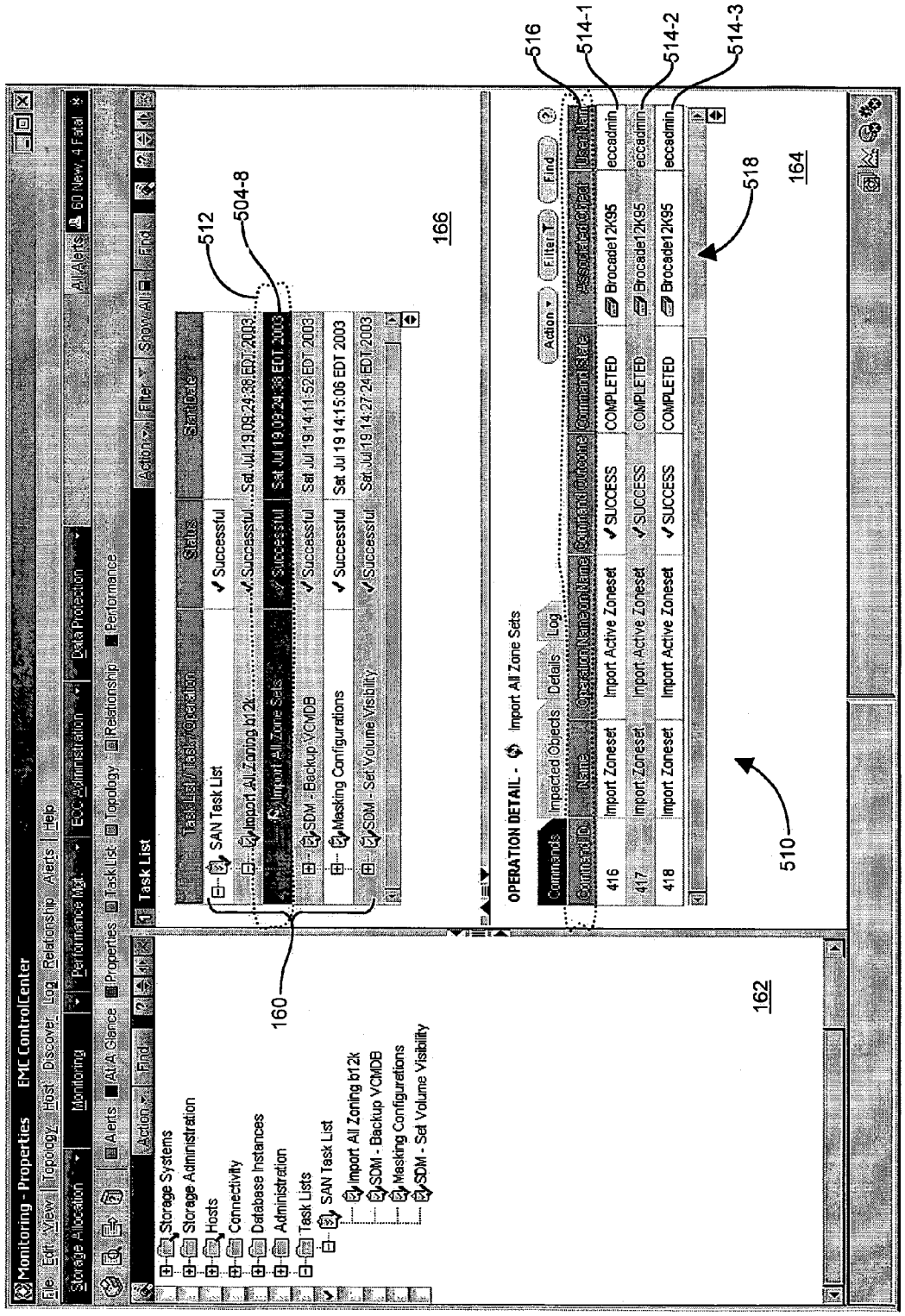

FIG. 8 shows a context specific detail 510 in the context specific pane 164. Operation 504-8 is selected in the task list pane 166, shown by dotted line 512. Accordingly, the task manager 112 displays operation detail 510 in the context specific pane 164. The displayed operation detail 510 displays a set of commands 514-1 . . . 514-3 included in the "import all zone sets" operation 508-4, along with pertinent attributes, as indicted by the dotted line 516. In general, the context specific pane 164 displays pertinent details concerning selected line items 165 in the task list pane 166.

Figure 9:
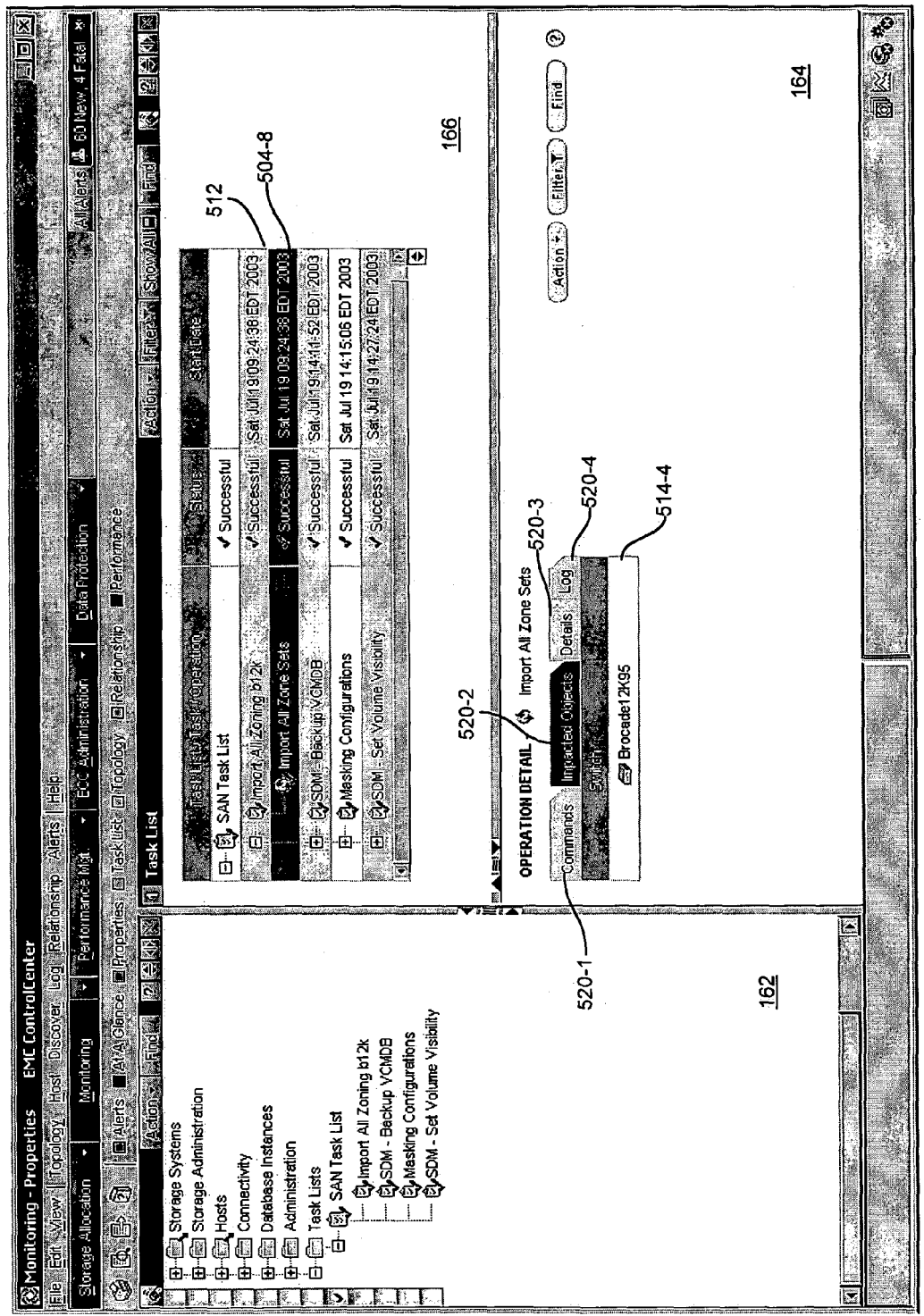

FIG. 9 shows selectable tabs in the context specific pane 164. Referring to FIG. 9, the operation detail 510 of FIG. 8 includes selection tabs 520-1 . . . 520-4. Selection tab 520-2, corresponding to "impacted objects" is selected. Accordingly, a single line item 514-4 is displayed, to indicate the associated object Brocade12K65, also common to the associated object field 518 of FIG. 8. Other tabs 520-1 . . . 520-4 are also selectable, and likewise correspond to the selected line item 504-8 in the task list pane 166.

Figure 10:
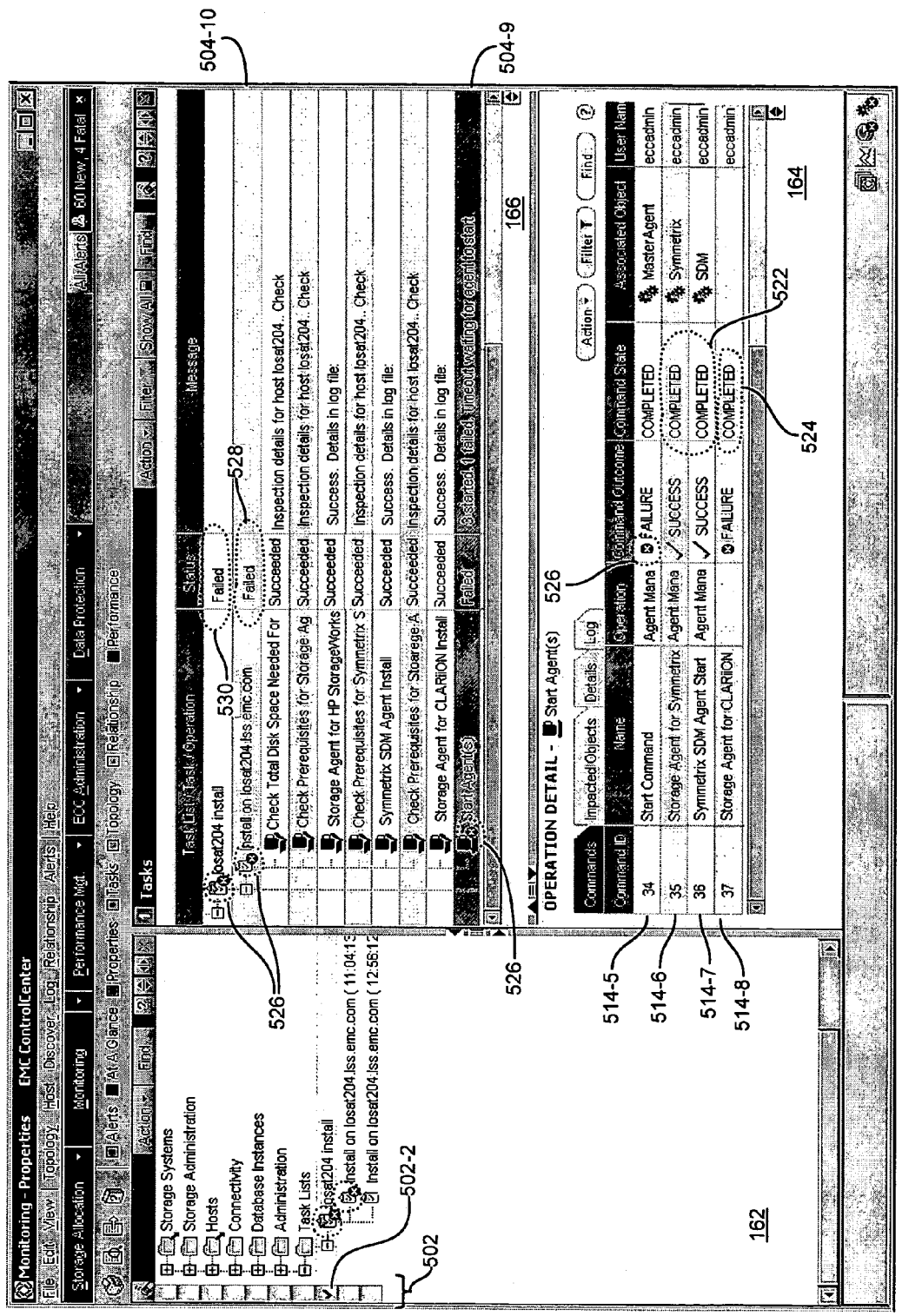

FIG. 10 shows command and operation status in the context specific pane 164. Referring to FIG. 10, the selected task 502-2 attempts to start three agents and a corresponding master agent. The selected operation 504-9 attempts to start the four agents, shown by line items 514-5 . . . 514-8. The agents corresponding to line items 514-6 and 514-7 start successfully, shown by status attributes 522. The agent displayed in line item 514-8, however, fails to start, as shown by status attribute 524. Accordingly, because a subordinate agent startup command failed, startup of the corresponding master agent fails, shown by line item 514-5 and a synopsis icon 526. Further, the start agent operation 504-9 fails, shown by synopsis icon 526, and likewise, the task including the failed operation, shown by line item 504-10 and status attribute 528, fails, as does the task list, shown by attribute 530 and synopsis icons 526.

The task management user interface disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for task management as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for task management has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. In a storage area network, a method for executing tasks associated with storage area network management comprising:
    enumerating a plurality of tasks which have previously been scheduled for execution by the storage area network, the tasks corresponding to a plurality of applications for performing management operations on manageable entities in the storage area network;
    organizing the tasks according to a hierarchical structure indicative of related tasks and manageable entities affected by the tasks and organizing the tasks according to a plurality of attributes, wherein the same task is identifiable by each of the plurality of attributes and wherein the attributes include status, logs, and affected manageable entities; and
    presenting a plurality of display panes on a display screen, each of the display panes operable to display task management information;
        wherein a first of the plurality of display panes comprise an ordered display of the tasks, the ordered display dynamically responsive to user requests and indicative of the organized hierarchical structure;
        wherein a second of the plurality of display panes, separate from the first display pane, comprises a selection tree pane which displays a hierarchical selection tree indicative of tasks;
        wherein a third of the plurality of display panes, separate from the first and second display panes, comprises a context details pane which displays context specific details corresponding to a selected row icon in the task list pane.

2. The method of claim 1 further comprising managing the tasks, managing further comprising:
    identifying at least one of the tasks, from the ordered display, based on an attribute of the tasks; and
    displaying context specific parameters of the task.

3. The method of claim 2 further comprising:
    receiving the user request from a user indicative of a particular task and management function; and
    performing the selected management function on the selected task.

4. The method of claim 3 wherein management functions include request status, schedule execution, termination, display operational details, order modification, sort, identify type, and operation breakdown.

5. The method of claim 1 further comprising:
    identifying an application corresponding to the task;
    referencing, in a repository, a dialog corresponding to the application for generating the task;
    performing the dialog to generate the task, the dialog comprising an interactive sequence for gathering parameters concerning the desired task; and
    associating the generated task with the plurality of tasks.

6. The method of claim 1 wherein enumerating a task for execution further comprises:
    identifying an application corresponding to the task;
    performing a dialog corresponding to the application for generating the task, the dialog operable to invoke the application for completing SAN maintenance instructions by the application; and
    associating the generated task with the plurality of tasks.

7. The method of claim 6 wherein the related tasks comprise task lists, the organizing further comprising organizing related tasks as children of the task list, the related tasks operable to be executed together.

8. The method of claim 7 wherein the tasks include operations, the operations defining a predetermined order of steps for completion of the task.

9. A network management device for executing tasks associated with storage area network management comprising:
    a processor;
    a network interface responsive to the processor and coupled to a storage area network;
    a memory for storing instructions and data, the processor responsive to the instructions;
    a task engine operable to enumerate a plurality of tasks which have previously been scheduled for execution by the storage area network, the tasks corresponding to a plurality of applications for performing management operations on manageable entities in the storage area network;
    a task manager coupled to the task engine operable to organize the tasks according to a hierarchical structure indicative of related tasks and manageable entities affected by the tasks and organizing the tasks according to a plurality of attributes, wherein the same task is identifiable by each of the plurality of attributes and wherein the attributes include status, logs, and affected manageable entities; and
    an interactive output device responsive to the task manger for presenting a plurality of display panes on a display screen, each of the display panes operable to display task management information;
        wherein a first of the plurality of display panes comprise an ordered display of the tasks, the ordered display dynamically responsive to user requests and indicative of the organized hierarchical structure;
        wherein a second of the plurality of display panes, separate from the first display pane, comprises a selection tree pane which displays a hierarchical selection tree indicative of tasks;
        wherein a third of the plurality of display panes, separate from the first and second display panes, comprises a context details pane which displays context specific details corresponding to a selected row icon in the task list pane.

10. The network management device of claim 9 wherein the task manager is further operable to:
identify at least one of the tasks, from the ordered display, based on an attribute of the tasks; and
display context specific parameters of the task.

11. The network management device of claim 10 wherein the task manager is further operable to:
receive the user request, via the interactive output device, from a user indicative of a particular task and management function; and
perform the selected management function on the selected task.

12. The network management device of claim 11 wherein the management functions include request status, schedule execution, termination, display operational details, order modification, sort, identify type, and operation breakdown.

13. The network management device of claim 9 wherein the task engine is responsive to the task manager for enumerating a task for execution, the task engine further operable to:
identify an application corresponding to the task;
perform a dialog corresponding to the application for generating the task, the dialog operable to invoke the application for completing SAN maintenance instructions by the application; and
associate the generated task with the plurality of tasks.

14. The network management device of claim 13 wherein the related tasks comprise task lists, the organizing further comprising organizing related tasks as children of the task list, the related tasks operable to be executed together.

15. The network management device of claim 14 wherein the tasks include operations, the operations defining a predetermined order of steps for completion of the task.

16. A computer program product having a computer readable medium operable to store computer program logic embodied in computer program code encoded thereon for executing tasks associated with storage area network comprising:
computer program code for enumerating a plurality of tasks which have previously been scheduled for execution by the storage area network, the tasks corresponding to a plurality of applications for performing management operations on manageable entities in the storage area network;
computer program code for organizing the tasks according to a hierarchical structure indicative of related tasks and manageable entities affected by the tasks and organizing the tasks according to a plurality of attributes, wherein the same task is identifiable by each of the plurality of attributes and wherein the attributes include status, logs, and affected manageable entities; and
computer program code for presenting a plurality of display panes on a display screen, each of the display panes operable to display task management information;
wherein a first of the plurality of display panes comprise an ordered display of the tasks, the ordered display dynamically responsive to user requests and indicative of the organized hierarchical structure;
wherein a second of the plurality of display panes, separate from the first display pane, comprises a selection tree pane which displays a hierarchical selection tree indicative of tasks;
wherein a third of the plurality of display panes, separate from the first and second display panes, comprises a context details pane which displays context specific details corresponding to a selected row icon in the task list pane.

17. A network management device for executing tasks associated with a storage area network management comprising:
means for enumerating a plurality of tasks which have previously been scheduled for execution by the storage area network, the tasks corresponding to a plurality of applications for performing management operations on manageable entities in the storage area network;
means for organizing the tasks according to a hierarchical structure indicative of related tasks and manageable entities affected by the tasks and organizing the tasks according to a plurality of attributes, wherein the same task is identifiable by each of the plurality of attributes and wherein the attributes include status, logs, and affected manageable entities; and
means for presenting a plurality of display panes on a display screen, each of the display panes operable to display task management information;
wherein a first of the plurality of display panes comprise an ordered display of the tasks, the ordered display dynamically responsive to user requests and indicative of the organized hierarchical structure;
wherein a second of the plurality of display panes, separate from the first display pane, comprises a selection tree pane which displays a hierarchical selection tree indicative of tasks;
wherein a third of the plurality of display panes, separate from the first and second display panes, comprises a context details pane which displays context specific details corresponding to a selected row icon in the task list pane.

* * * * *